(12) United States Patent
Elbracht et al.

(10) Patent No.: US 10,737,771 B2
(45) Date of Patent: Aug. 11, 2020

(54) AIRCRAFT AIRFLOW MODIFICATION DEVICE AND VORTEX GENERATOR ARRANGEMENT FOR AN AIRCRAFT

(71) Applicant: Airbus Operations GmbH, Hamburg (DE)

(72) Inventors: Dirk Elbracht, Hamburg (DE); Bruno Stefes, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 281 days.

(21) Appl. No.: 15/819,560

(22) Filed: Nov. 21, 2017

(65) Prior Publication Data

US 2018/0155013 A1 Jun. 7, 2018

(30) Foreign Application Priority Data

Nov. 21, 2016 (EP) ..................... 16199770

(51) Int. Cl.
*B64C 23/06* (2006.01)
*B64C 21/08* (2006.01)
*B64C 3/52* (2006.01)
*B64C 9/16* (2006.01)
*B64C 21/00* (2006.01)

(52) U.S. Cl.
CPC ............ *B64C 23/06* (2013.01); *B64C 3/52* (2013.01); *B64C 9/16* (2013.01); *B64C 21/00* (2013.01); *B64C 21/08* (2013.01); *Y02T 50/162* (2013.01); *Y02T 50/166* (2013.01)

(58) Field of Classification Search
CPC ......... B64C 21/00; B64C 21/08; B64C 23/06; B64C 3/52; B64C 9/16; Y02T 50/162

USPC ...................................................... 244/200.1
See application file for complete search history.

(56) References Cited

U.S. PATENT DOCUMENTS

| | | | |
|---|---|---|---|
| 5,209,438 A * | 5/1993 | Wygnanski | B64C 23/00 244/200.1 |
| 5,326,050 A | 7/1994 | Zell | |
| 5,598,990 A * | 2/1997 | Farokhi | B64C 23/06 244/198 |
| 5,755,408 A * | 5/1998 | Schmidt | B64C 21/00 244/130 |
| 6,105,904 A | 8/2000 | Lisy et al. | |
| 6,685,143 B1 | 2/2004 | Prince et al. | |
| 7,878,457 B2 * | 2/2011 | Narramore | B64C 23/06 244/200.1 |
| 8,405,012 B1 * | 3/2013 | Herman | B81B 3/0027 244/3.27 |
| 9,464,532 B2 * | 10/2016 | Sutton | F01D 7/00 |

(Continued)

FOREIGN PATENT DOCUMENTS

WO 9950141 10/1999

OTHER PUBLICATIONS

European Search Report, dated Mar. 2, 2017, priority document.

*Primary Examiner* — Claude J Brown
(74) *Attorney, Agent, or Firm* — Greer, Burns & Crain Ltd.

(57) ABSTRACT

An aircraft airflow modification device, comprising: at least one resiliently deformable base member; and at least one resiliently deformable flap member that extends from the resiliently deformable base member. Deformation of the resiliently deformable base member from a first state to a second state results in corresponding deformation of the resiliently deformable flap member from a first state to a second state.

13 Claims, 8 Drawing Sheets

(56) References Cited

U.S. PATENT DOCUMENTS

| | | | |
|---|---|---|---|
| 9,845,147 B2* | 12/2017 | Emerick | B64C 21/02 |
| 2008/0217485 A1 | 9/2008 | Ikeda | |
| 2008/0251647 A1 | 10/2008 | Lorkowski et al. | |
| 2009/0120205 A1 | 5/2009 | Clingman | |
| 2011/0008174 A1* | 1/2011 | Ireland | B64C 23/06 |
| | | | 416/223 R |
| 2011/0142595 A1 | 6/2011 | Santiago et al. | |
| 2012/0325325 A1* | 12/2012 | Quackenbush | F02C 7/04 |
| | | | 137/1 |
| 2014/0331665 A1* | 11/2014 | Shivashankara | B64C 9/32 |
| | | | 60/527 |
| 2015/0010400 A1 | 1/2015 | Vossler et al. | |

* cited by examiner

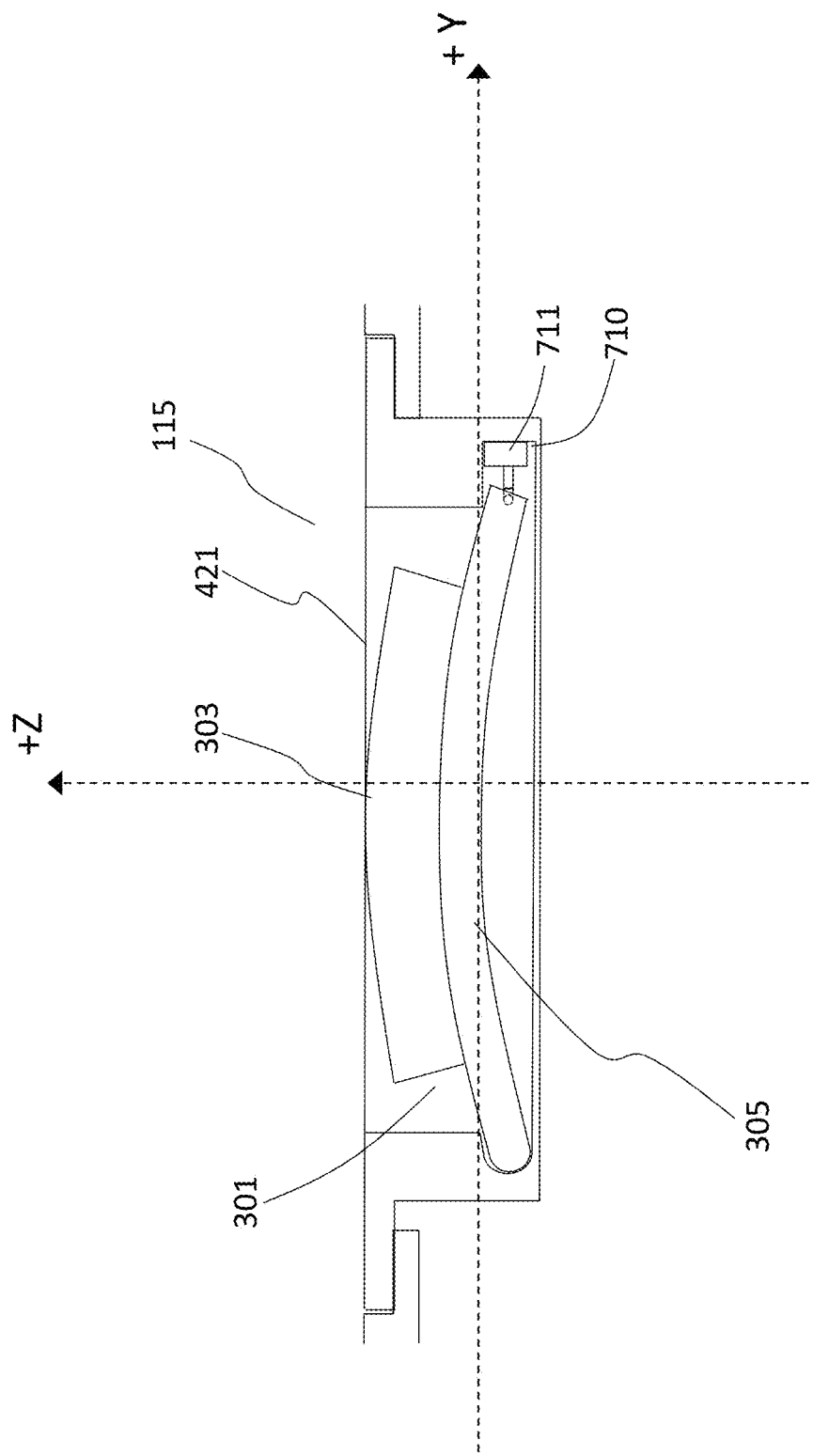

AIRCRAFT AIRFLOW MODIFICATION DEVICE AND VORTEX GENERATOR ARRANGEMENT FOR AN AIRCRAFT

CROSS-REFERENCES TO RELATED APPLICATIONS

This application claims the benefit of the European patent application No. 16199770.5 filed on Nov. 21, 2016, the entire disclosures of which are incorporated herein by way of reference.

FIELD OF TECHNOLOGY

The present technology relates to an aircraft airflow modification device and a vortex generator arrangement for an aircraft comprising an aircraft airflow modification device.

BACKGROUND OF THE INVENTION

The vertical tail plane of an aircraft and the vertical rudder mounted to the vertical tail plane provide a means to control a yawing moment for rotating the aircraft about its vertical or yawing axis. They therefore provide directional stability and control. The maximum yawing moment that can be generated by the rudder depends on the size of the rudder and the degree by which the rudder can be deflected about a rudder axis. In other words, more yawing moment can be generated with a larger rudder or a rudder that can be deflected by a greater angle. As the rudder can only be deflected by a limited angle to avoid stalling of the flow at the rudder, the maximum yawing moment is largely determined by the overall shape and surface area of the rudder and the vertical tail plane.

Maximum yawing moment is never required under regular operating conditions, therefore most of the yawing moment that could be generated by the vertical rudder remains unused, which results in unnecessary aerodynamic drag and as drag increases, the fuel consumption increases, which reduces the maximum range of the aircraft. Therefore, any unnecessary drag should be avoided.

SUMMARY OF THE INVENTION

In view of the above it can be considered an object of the present technology to improve the flow by the vertical tail plane and the vertical rudder without having to increase the dimensions of the vertical tail plane. A further object of the present technology is to provide a vortex generator arrangement that is less prone to failure or less costly to maintain by having few moving parts in its design.

An embodiment of the present technology provides an aircraft airflow modification device comprising at least one resiliently deformable base member at least one resiliently deformable flap member that extends from the resiliently deformable base member, wherein deformation of the resiliently deformable base member from a first state to a second state results in corresponding deformation of the resiliently deformable flap member from a first state to a second state.

The first state of the resiliently deformable flap member and the corresponding first state of the resiliently deformable base member may be unbuckled states, and the second state of the resiliently deformable flap member and the corresponding second state of the resiliently deformable base member may be buckled states.

The resiliently deformable flap member or the resiliently deformable base member may be formed from at least one non-metallic material, metallic material or composite material.

The lateral dimension of the resiliently deformable base member may be approximately 80 mm. The lateral dimension of the resiliently deformable flap member may be approximately 60 mm. The vertical dimension of the resiliently deformable flap member may be approximately 20 mm. The thickness of the resiliently deformable flap member may be approximately 1 mm.

The resiliently deformable flap member may be integrally formed with the resiliently deformable base member.

A further embodiment of the present technology provides a vortex generator arrangement for an aircraft comprising a section that defines an opening and a corresponding cavity, an aircraft airflow modification device disposed within the cavity further comprising a resiliently deformable flap member and a resiliently deformable base member, wherein the resiliently deformable flap member of the aircraft airflow modification device in a first state extends through the opening when the resiliently deformable base member is in a corresponding first state, and wherein the resiliently deformable flap member of the aircraft airflow modification device in a second state is retracted from the opening when the resiliently deformable base member is in a corresponding second state.

The first state of the resiliently deformable flap member and the corresponding first state of the resiliently deformable base member may be unbuckled states.

The second state of the resiliently deformable flap member and the corresponding second state of the resiliently deformable base member may be unbuckled states. Alternatively, the first state of the resiliently deformable flap member may be an unbuckled state and the corresponding first state of the resiliently deformable base member may be buckled states or vice versa.

The vortex generator arrangement may further comprise at least one actuator arrangement configured to apply a force to the resiliently deformable base member of the aircraft airflow modification device so as to deform it from a first state to second state or vice versa. The actuator arrangement may be configured to provide a force substantially in the direction of the vertical axis of the resiliently deformable base member. The actuator arrangement may be configured to provide a force substantially in the direction of the lateral axis of the resiliently deformable base member.

A further embodiment provides an aircraft with at least one vortex generator arrangement. The vortex generator arrangement may be installed on a surface assembly of an aircraft, for example an engine pylon, a fuselage or a fairing. The surface assembly may be a lifting surface assembly, for example a vertical or horizontal tail plane, a canard, a wingtip device, a wing or high-lift device.

Advantages of the present technology will now become apparent from the detailed description with appropriate reference to the accompanying drawings.

BRIEF DESCRIPTION OF THE DRAWINGS

Embodiments of the technology will now be described, by way of example only, with reference to the following drawings in which:

FIG. 7B is a front sectional view of vortex generator arrangement of FIG. 4B, according to a further embodiment of the present technology.

DETAILED DESCRIPTION OF THE PREFERRED EMBODIMENTS

Figure 1:
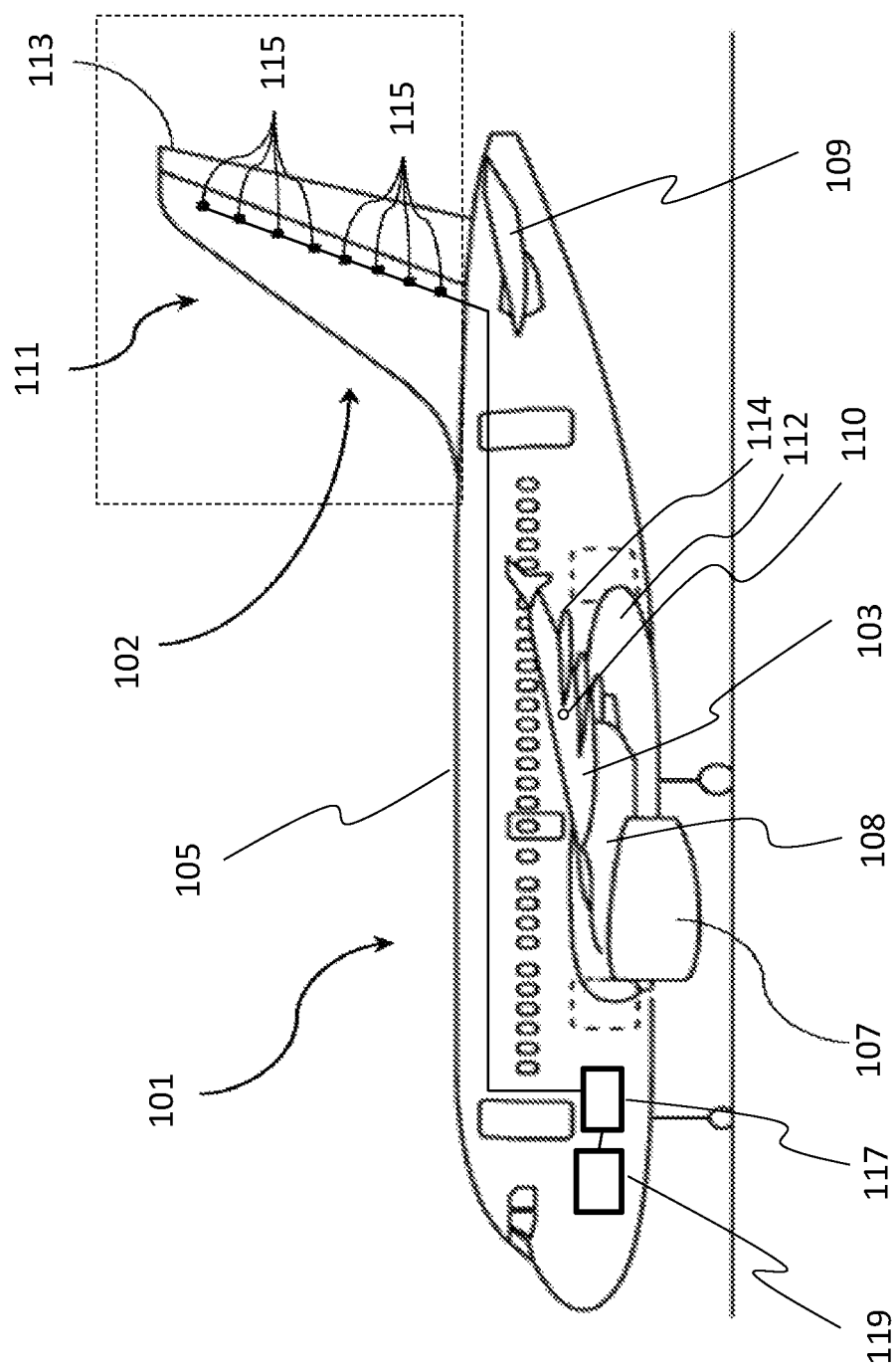
FIG. 1 is a side view of an aircraft comprising a plurality of vortex generator arrangements and a system for operating the vortex generator arrangements.

With reference to FIG. 1, an aircraft 101 comprises a pair of lifting surface assemblies in the form of wings 103 that join into a fuselage 105. Each wing 103 comprises hinged control surfaces such as ailerons and spoilers (not shown), and high-lift devices such as flaps and slats (not shown). Each wing 103 carries an engine 107 that is mounted using a wing to engine pylon 108. The aircraft 101 comprises further lifting surface assemblies in the form of a horizontal tail plane 109 and a vertical tail plane 111, each attached at the rear of the fuselage 105. The vertical tail plane 111 is provided with a hinged control surface in the form of a rudder 113. The aircraft 101 comprises other surface assemblies such a belly fairing 112 which fairs the wings 103 to the fuselage 105, and high-lift device fairings 114 that fair portions of the flaps (not shown) into the respective wing 103.

In the present embodiment, the aircraft 101 further comprises a plurality of vortex generator arrangements 115 installed in the vertical tail plane 111. The deflection of each control surface, as well as each vortex generator arrangement 115, is controlled by at least one flight control unit 117. The flight control unit 117 receives inputs from at least one sensor unit 119 and commands deflections according to a predefined flight envelope stored on a medium (not shown) that is connected the flight control unit 117.

Figure 2:
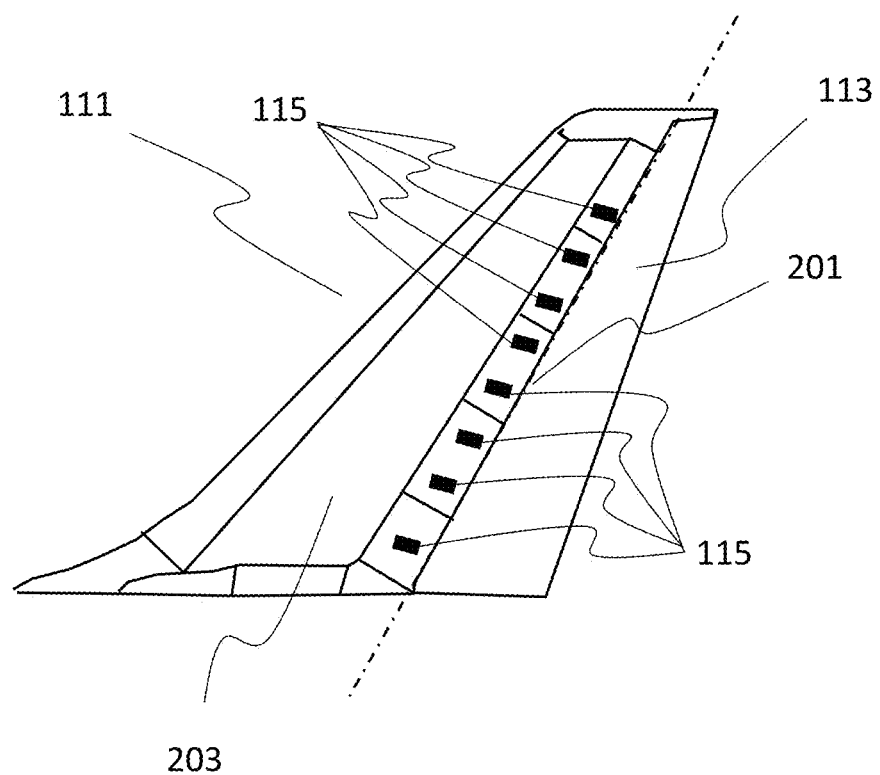
FIG. 2 is a close-up view of the vertical tail plane of the aircraft of FIG. 1 showing the vortex generator arrangement positions in more detail.

With reference to FIG. 2, in the present embodiment each vortex generator arrangement 115 is set apart from an adjacent vortex generator arrangement 115 in a spanwise direction of the vertical tail plane 111. Each vortex generator arrangement 115 is installed in the main body 203 of the vertical tail plane 111 and has a chordwise position that is set forward of a foremost edge 201 of the rudder 113.

Figure 3A:
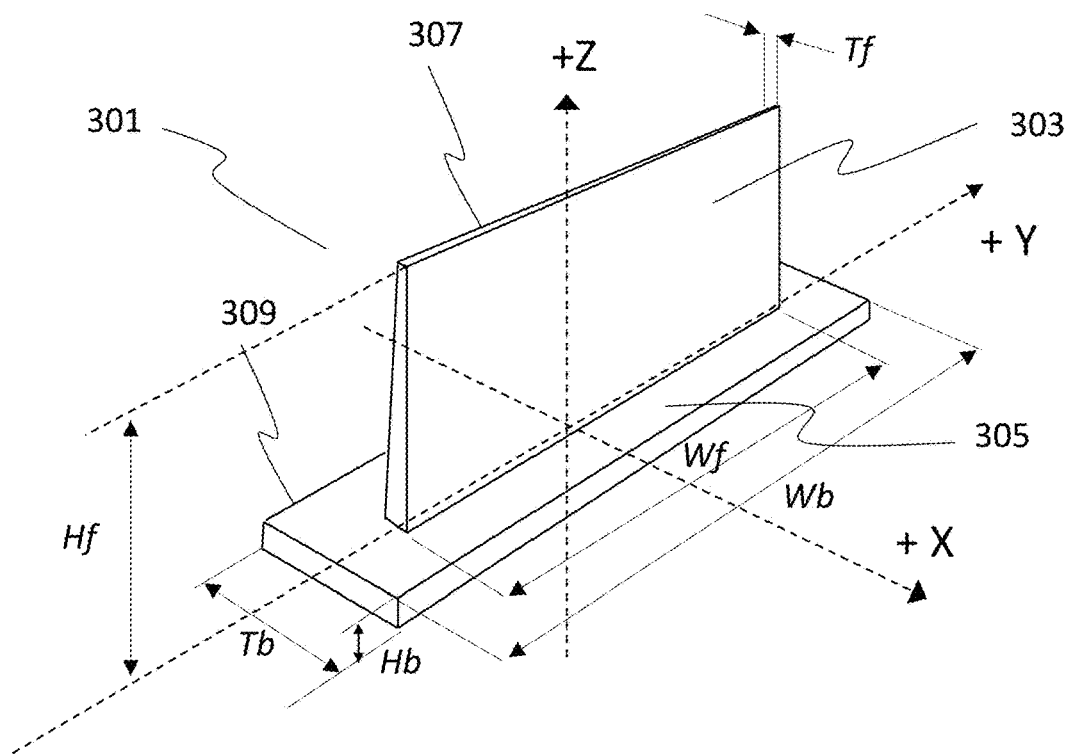
FIG. 3A is an isometric view of an aircraft airflow modification device of one of the vortex generator arrangements of FIGS. 1 and 2 in a first state that is extended.

With reference to FIG. 3A, in the present embodiment an aircraft airflow modification device 301 is provided comprising a resiliently deformable flap member 303 that is laminated to a resiliently deformable base member 305 so as to form a single integrally formed component, i.e., it has no hinges or separate connector elements. In a first state, the resiliently deformable flap member 303 is substantially planar and rectangular in shape and extends substantially perpendicular in the YZ plane from the resiliently deformable base member 305, which is also in a corresponding first state, such that a sidemost edge 307 of the resiliently deformable flap member 303 is approximately coincident with the YZ plane.

The resiliently deformable flap member 303 is formed from 8 plies of co-cured GFRP laminate material that is stepped from down to 4 layers at its edge 307. An Epoxy/E-Glass composite may be used for each layer.

The resiliently deformable flap member 303 may have a dimension Hf in the Z direction of at least 10 mm, but preferably it has a dimension Hf in the Z direction of 20 mm. The resiliently deformable flap member 303 may have a dimension Wf in the Y direction of at least 30 mm, but preferably it has a dimension Wf in the Z direction of 60 mm. The resiliently deformable flap member 303 may have a dimension Tf in the X direction of at least 0.5 mm, but preferably it has a dimension Tf in the X direction of 1 mm.

The resiliently deformable base member 305 is formed of a rectangular GFRP laminated profile such that the resiliently deformable flap element 303 has a relatively low lateral stiffness when compared to the resiliently deformable base member 305.

The resiliently deformable base member 305 may have a dimension Hb in the Z direction of at least 2 mm, but preferably it has a dimension Hb in the Z direction of 5 mm.

The resiliently deformable base member 305 may have a dimension Wb in the Y direction of at least 60 mm (i.e., the same Y dimension as the resiliently deformable flap member 303), but preferably it has a dimension Wb in the Y direction of 80 mm.

The resiliently deformable base member 305 preferably has a dimension Tb in the X direction of 20 mm.

Alternatively, the resiliently deformable flap member 303 or the resiliently deformable base member 305 may be formed by any other suitable material such as non-metallic, metallic or composite material, and further, by any suitable means including but not limited to laying-up and curing the material, by additive layer manufacturing, or by machining, forming, casting, or molding the material. Furthermore, the resiliently deformable flap member 303 and the resiliently deformable base member 305 may be integrally formed.

Furthermore, the resiliently deformable flap member 303 might not be rectangular in shape and instead it may have a foremost or rearmost edge that is swept. It may instead be triangular in shape. Alternatively, it may comprise edges which are curved. It may instead be semi-circular or semi-elliptical in shape.

Figure 3B:
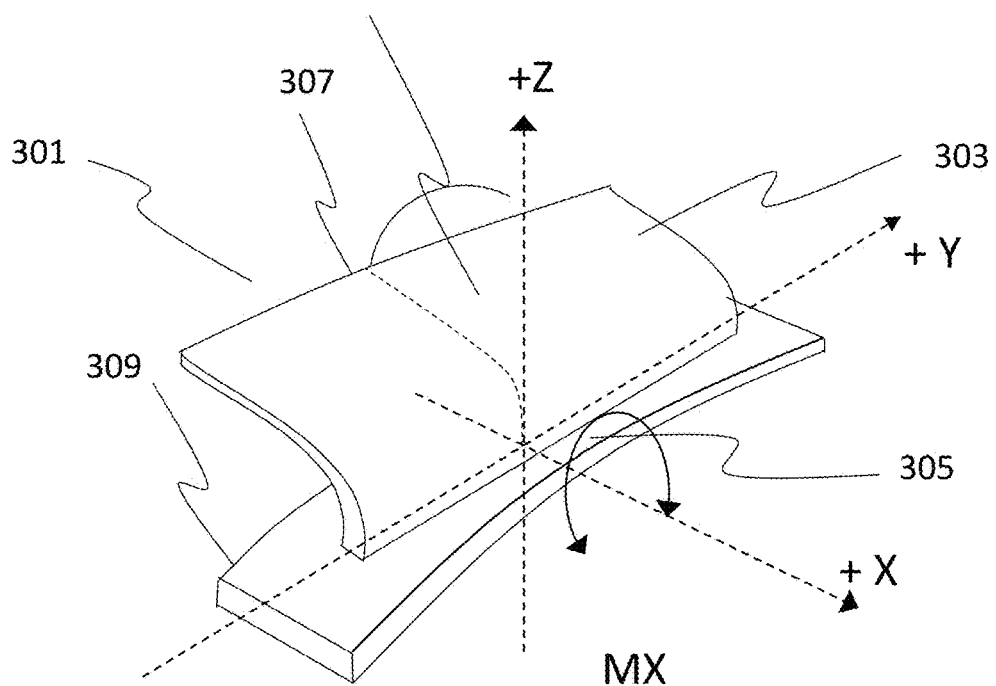
FIG. 3B is an isometric view of the aircraft airflow modification device of FIG. 3A in a second state that is retracted.

The aircraft airflow modification device 301 shown in the first state of FIG. 3A is shown in a second state in FIG. 3B. In response to a positive bending moment Mx about the X axis, the resiliently deformable base member 305 undergoes uniaxial elastic bending to a second state, which results in unsymmetrical elastic buckling of the resiliently deformable flap member 303 to a corresponding second state. This is caused by lateral torsional buckling of the resiliently deformable flap member 303 that has a lower overall lateral stiffness compared to that of the resiliently deformable base member 305. When the resiliently deformable flap member 303 is in the second state, its sidemost edge 307 is at an angle A relative to the YZ plane that is approximately perpendicular.

Removal of the bending moment Mx from the resiliently deformable base member 303 (i.e., inducing it from the second state back to the first state) results in the resiliently deformable flap member 303 and the resiliently deformable base member 305 elastically deforming back to their respective unbuckled first states, where the sidemost edge 307 of the resiliently deformable flap member 303 returns to a position approximately coincident to the YZ plane and the resiliently deformable base member 305 is substantially rectangular in shape.

In the present embodiment, the resiliently deformable flap element 303 is in an extended configuration when the first state is an unbuckled state and in a retracted configuration when the second state is a buckled state. Correspondingly, the resiliently deformable base member 305 is unbuckled for the first state and buckled for the corresponding second state. It should however be appreciated that different variations can be achieved that will be appreciated by the skilled person, for example the aircraft airflow modification may be configured and manufactured such that the resiliently deformable flap element 303 is extended and unbuckled in a first state that corresponds to a buckled first state of the resiliently deformable base member 305.

Figure 4A:
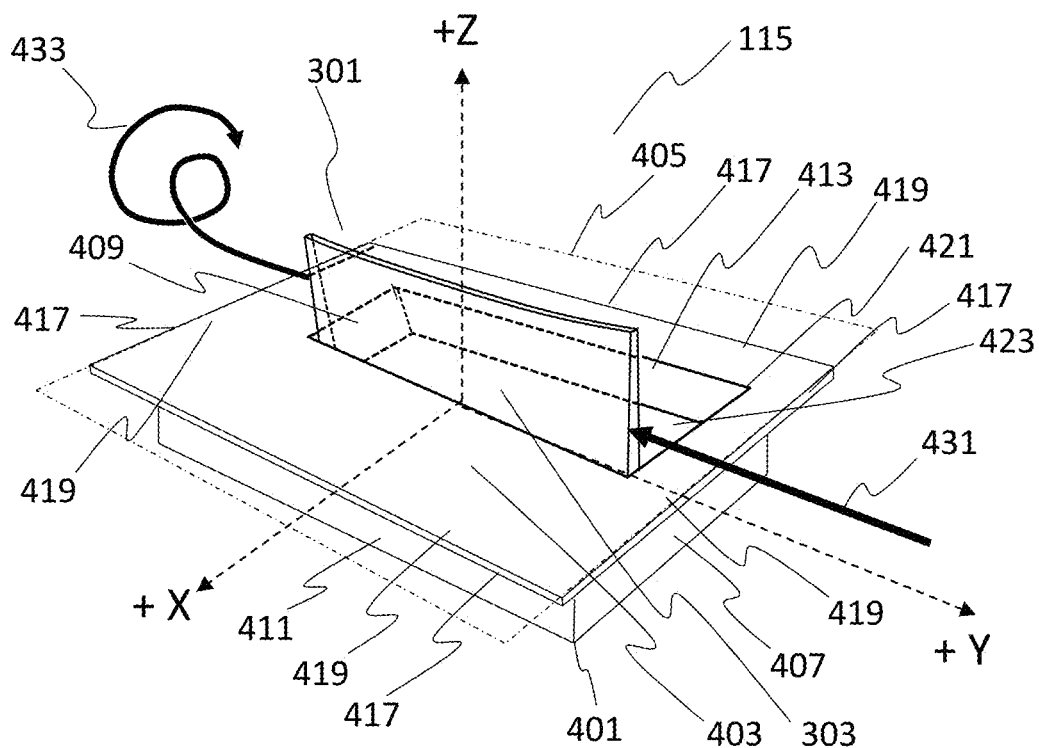
FIG. 4A is an isometric view of one of the vortex generators arrangements of FIGS. 1 and 2 comprising an aircraft airflow modification device in a first state that is extended.

With reference to FIG. 4A, in the present embodiment each vortex generator arrangement 115 comprises a casing 401 that is overall substantially rectangular in shape; having an outer cover 403 that is defined by a section 405 that is substantially co-planar with the outermost surface (commonly also referred to as the outer mold line or OML) of the vertical tail plane 111 (not shown). It should be appreciated that the exact shape of the casing 401 may be determined by the space available in which it is to be installed, and therefore it may not be rectangular in shape. The casing 401 comprises a foremost wall 407 and a rearmost wall 409, each lying approximately parallel to the XZ plane, and a pair of sidewalls 411, 413, each lying approximately parallel to the YZ plane, and an innermost wall 414 (not shown) lying approximately parallel to the XY plane and offset from the outer cover 403. The casing 401 is a unitary component formed from CFRP material. It may, however, be an assembly of two or more separate sub-components formed from the same material that are attached to one another by any suitable means such as by replaceable fasteners. Such an arrangement may be preferable for subsequent assembly and disassembly of the vortex generator arrangement 115. The casing 401 may also be formed by any other suitable non-metallic, metallic or composite material using any suitable manufacturing means such as additive layer manufacturing, machining, forming, casting, molding, or lay-up and curing.

A peripheral edge 417 of the outer cover 403 is configured so as to extend substantially perpendicular from the walls 407, 409, 411, 413 of the casing 401 so as to define an overhang 419 that is configured to attach to the corresponding peripheral edges 501 (not shown) provided by the vertical tail plane 111.

The overhang 419 extends substantially along the entire peripheral edge 417, i.e., along the front, rear and both side walls 407, 409, 411, 413 of the vortex generator arrangement 115. This overlapping arrangement may, however, not be continuous around the peripheral edge of the top cover 403. In the present embodiment, counter-sunk quick release fasteners (not shown) are used in combination with corresponding nut plates (not shown) affixed to the portions of the surrounding structure, to assemble the vortex generator arrangement 115 to the vertical tail plane 111. This provides system that is line replaceable, which is important for in-service operations, where a failed unit can be replaced quickly to prevent unnecessary delay during normal operation. Alternatively, it may form an integral part of the vertical tail plane 111, i.e., part of the cover of the vertical tail plane 111.

The section 405 also defines an opening 421 in the outer cover 403 of the casing 401 to a corresponding cavity 423 within the casing 401 that is further defined by inner surfaces of the walls 407, 409, 411 and 413. The inner surfaces may be offset as shown, or may lie in close proximity to the edges of the resiliently deformable flap member 303. The edge of the opening 421 may comprise a large radius or chamfer which is configured to improve the airflow passing over the cavity 423.

Within the cavity 423 is disposed the aircraft airflow modification device 301 that is supported by the foremost and rearmost walls 407 and 409 of the casing 401 and that comprises the resiliently deformable flap member 303, which in the first state shown in FIG. 4A extends through the opening 421.

When the resiliently deformable flap member 303 is extended to the first state during operation of the aircraft 101, a portion of the airflow 431 in proximity to the outer cover 403 is modified by the resiliently deformable flap member 303 so as to create one or more airflow vortices 433 that flows rearwards from the position of the vortex generator arrangement 115 and over the vertical tail plane 111 and rudder 113.

Figure 4B:
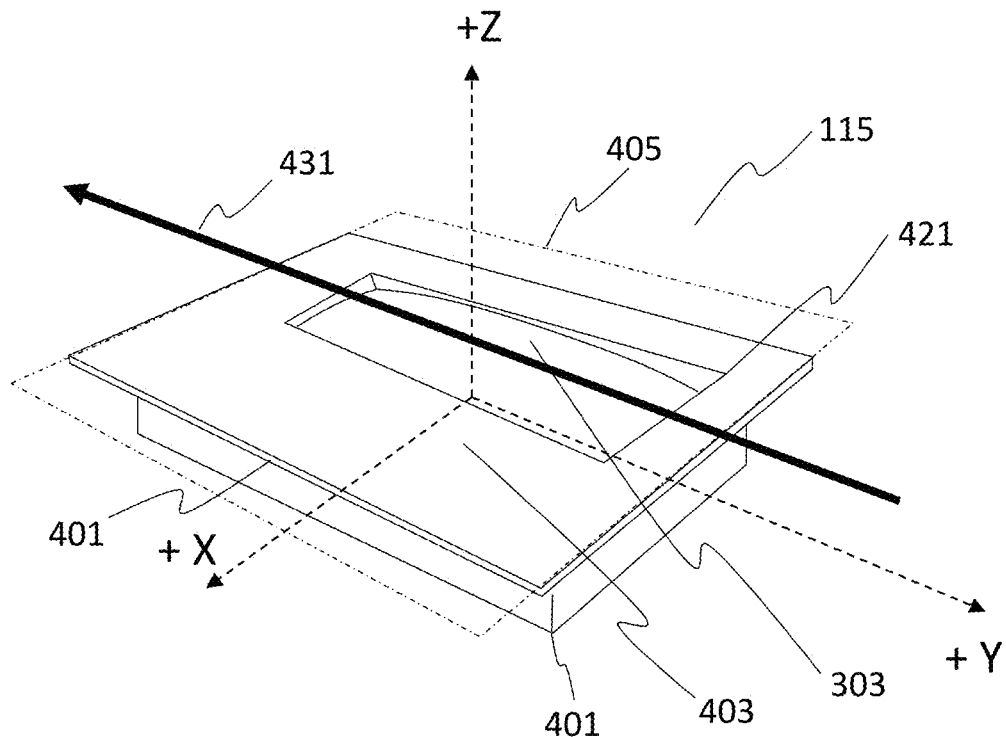
FIG. 4B is an isometric view of the vortex generator arrangement of FIG. 3B in a second state that is retracted.

With reference to FIG. 4B, the vortex generator arrangement 115 of FIG. 4A is shown in a second configuration where the resiliently deformable flap member 303 of the aircraft airflow modification device 301 is retracted from the opening 421 when it is in a second buckled state and the resiliently deformable base member is in a corresponding second buckled state, i.e., corresponding to the states shown in FIG. 3B.

A known effect of vortices 433 in proximity to a lifting surface undergoing airflow separation is to delay the onset of airflow separation from the lifting surface even though such vortices 433 also create an associated amount of form drag and vortex drag. Despite this drag penalty they are desirable in certain situations. For example, a vertical tail plane 111 or rudder 113 are sized bearing in mind parameters such as surface area, airfoil section, etc., so that they are capable of providing a sufficient yaw moment to control the aircraft 101 when they are operated at maximum angles of incidence relative to the freestream airflow direction. The sizing of the vertical tail plane 111 and rudder 113 for these situations may take into account a certain amount of lift loss due to flow separation which may be present. Therefore, in the context of present embodiment of the vertical tail plane 111 or the rudder 113, flow separation loss can be reduced or removed completely when vortices 433 are introduced forwards (upstream) of the areas of the vertical tail plane 111 and rudder 113 that would otherwise exhibit flow separation at higher angles of incidence. The vortex generator arrangement 115 of the present technology is a means of achieving this, which in turn allows for a reduction in the size and therefore weight of the vertical tail plane 111 and rudder 113 overall, which is advantageous in terms of manufacturing and operating cost of the aircraft 101.

With reference to FIG. 4B, retraction of the resiliently deformable flap member 303 restores the airflow in proximity to the vortex generator arrangement 115 to its nominal characteristics and avoids the form drag and vortex drag penalty that would otherwise occur. This configuration may be desirable where the vertical tail plane 111 or rudder 113 is not required to operate at high angles of incidence relative to the freestream airflow direction, for example, during cruise. In the present embodiment, the opening 423 may be further provided with a thin rupturable membrane configured to extend over the opening 423 in the plane of section 405 and fastened or glued to the outer cover 403. The rupturable membrane would provide an aerodynamic cover for the cavity 423 but be further configured to permanently rupture due to the resiliently deformable flap member 303 contacting it during the initial stages of its first extension so as not to inhibit the full extension or performance of the resiliently deformable flap member 303.

It should be appreciated, however, that it may be preferable that the resiliently deformable flap member 303 of the airflow modification device 301 is not retracted entirely into the cavity but that it instead lies substantially parallel to the plane of section 405 when it is in a second buckled state and the resiliently deformable base member is in a corresponding second buckled state. In such a configuration, the resiliently deformable flap member 303 would remain in the airflow in the retracted second state but not create any significant vortices 433 and associated drag. It may however create a level of form drag that would be acceptable.

A further advantage of using a vortex generator arrangement 115 comprising such an aircraft airflow modification device 301, is that the aircraft airflow modification device 301 has no moving parts so that its design is simplified. It may therefore also have a lower probability of failure due to wear or due to seizing in the presence of contaminants such as ice, oil or dust. This may lead to the need for a lower number of vortex generator arrangements 115, therefore reducing complexity or lower costs as a result of longer maintenance inspection intervals.

It should also be appreciated that one or more vortex generator arrangements 115 may be placed elsewhere on the vertical tail plane 111 in order to enhance the aerodynamic performance, for example at a foremost "leading" edge portion of the vertical tail plane 111 or rudder 113. It should further be appreciated that one or more vortex generator arrangements 115 may be placed elsewhere on the aircraft 101 in proximity to any other lifting surface where suppression of flow separation may be desirable. For example, one or more vortex generator arrangements 115 may be installed at a portion of the foremost edge or rearmost "trailing" edge of the wings 103, or of the horizontal stabilizers 109. Alternatively, they may be installed on another surface assembly such as the pylon 108 or an engine 103. Furthermore, one or more vortex generator arrangements 115 may be used to improve aero acoustical performance of the aircraft 101. For example, one or more vortex generator arrangements 115 may be positioned forward of (upstream) and in proximity to an aperture 110 defined by a portion of the outer surface of the aircraft 101, so as to generate one or more vortices 433 that may reduce audible Helm-Holtz induced frequencies from such an aperture 110.

Figure 5A:
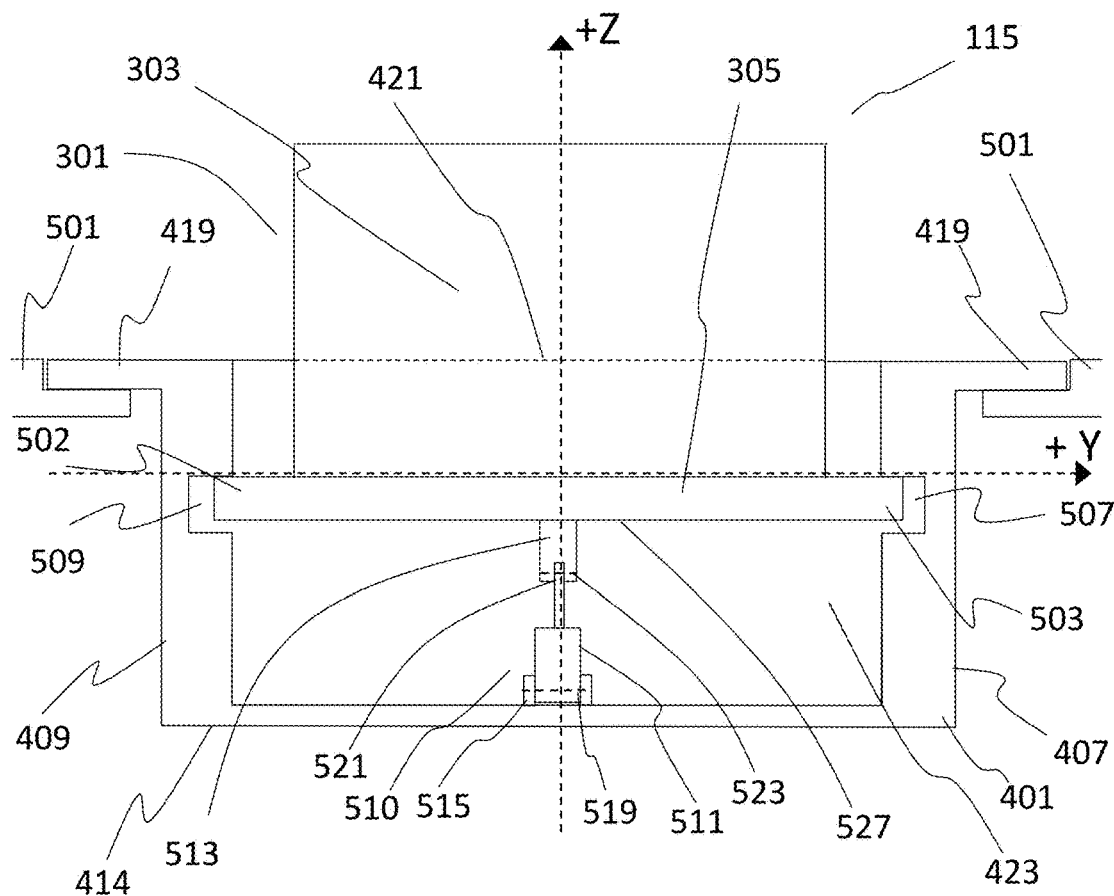
FIG. 5A provides a side section view of the vortex generator arrangement 115 along the YZ plane indicated in FIG. 4A.

With reference to FIG. 5A, an airflow modification device 301 is installed within the cavity 423. A first end 502 and a second end 503 of the resiliently deformable base member 305 are each positioned within a respective slot 509 and 507 defined by the rearmost wall 409 and foremost wall 407, respectively, such that the airflow modification device 301 is supported at both ends. An actuator arrangement 510 comprising an electrically powered linear actuator 511 and a coupling 513 are also installed within the cavity 423. It should be appreciated that the actuator arrangement may comprise any suitable alternative such as a rotary type actuator or piezo type actuator. The actuator may alternatively be hydraulically energized. A first end 515 of the linear actuator 511 has a lug and is pivotably mounted to a corresponding set of lugs provided by the innermost wall 414 of the cavity 423 with a clevis pin 519.

A second end 521 of the linear actuator 511 comprises a lug that is pivotably connected via another clevis pin 523 to a set of lugs provided by the coupling 513. The coupling 513 is fixedly attached to a lower surface 527 of the resiliently deformable base member 305 at a position approximately at its mid-length in the Y direction.

A universal ball joint type arrangement may alternatively be used instead of either of the pin arrangements used to connect the linear actuator 511 to the casing 401 or the coupling 513, which may permit a greater degree of freedom, if required.

When the actuator arrangement 510 is in a first position as shown in a FIG. 5A, the resiliently deformable base member 305 is in a first state which is an unbuckled state and the resiliently deformable flap member 303 is therefore in a corresponding first state that is also unbuckled. In this state, the resiliently deformable flap member 303 extends through the opening 421 and functions as a vortex generator in the presence of an airflow flowing over the vertical tail plane 111.

Figure 5B:
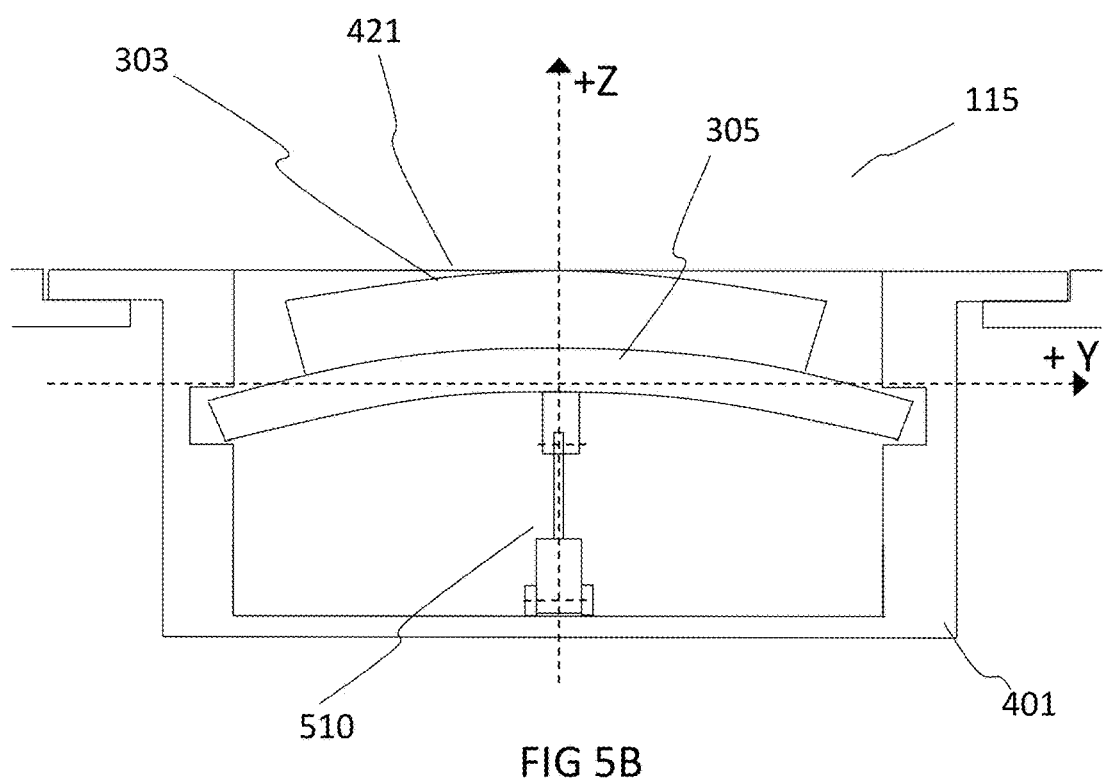
FIG. 5B provides a side section view of the vortex generator arrangement 115 along the YZ plane indicated in FIG. 4B.

With reference to FIG. 5B, all of the features of FIG. 5A are shown, however in 5B, the actuator arrangement 510 is actuated to second position, such that a force is provided substantially in the direction of the vertical axis of the resiliently deformable base member 305 such that the resiliently deformable base member 305 is deformed to a second state which is a buckled state and the resiliently deformable flap member 303 is therefore also deformed to a corresponding second state that is a buckled state. In this state, the resiliently deformable flap member 303 is retracted from the opening 421 such that the resiliently deformable flap member 303 extends substantially in the plane of the section 405 (i.e., in the plane of the OML) so that there is no substantial modification of the airflow in proximity to the opening 421. By removing the vertical force applied to the actuator arrangement 510, for example by de-energizing the linear actuator 511, the elastic energy stored within the aircraft airflow modification device 301 is sufficient to drive the linear actuator 511 back, so as to restore the aircraft airflow modification device 301 from the buckled second state to the unbuckled first state. Not requiring power or a command to the linear actuator 511 in order to extend the resiliently deformable flap member 303 is advantageous in that the design, as a result, is inherently fail safe and ensures that in the absence of power, a maximum yaw moment capability of the vertical tail plane 111 and rudder 113 is available if required, albeit in exchange for a minimal drag penalty.

It should be appreciated that the aircraft airflow modification device 301 may alternatively be actuated and deformed between first and second states by deformation of the surrounding structure acting on the resiliently deformable base member 305 or by pressure differences acting on the resiliently deformable flap member 303 due to the airflow external to the cavity, rather than by actuation of a particular types of powered actuator arrangements described so far.

Figure 6A:
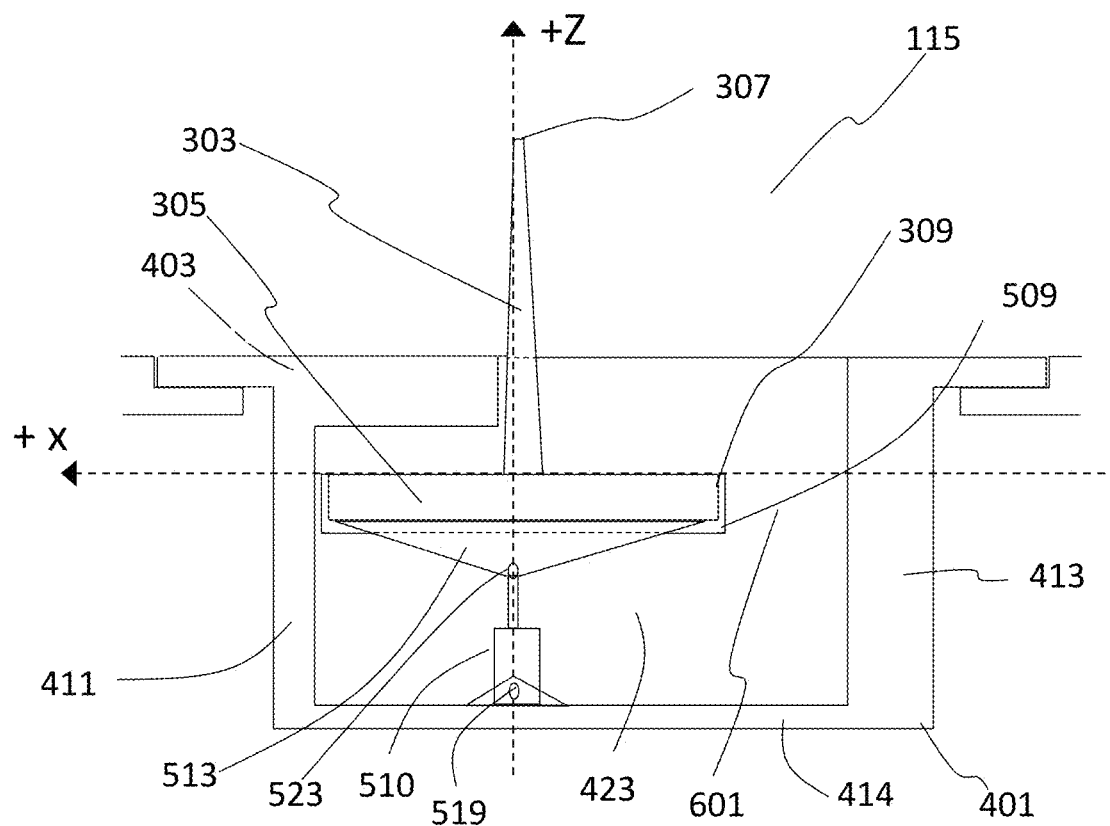
FIG. 6A is a front sectional view of vortex generator arrangement of FIG. 4A through the plane XZ given in FIG. 4A.
Figure 6B:
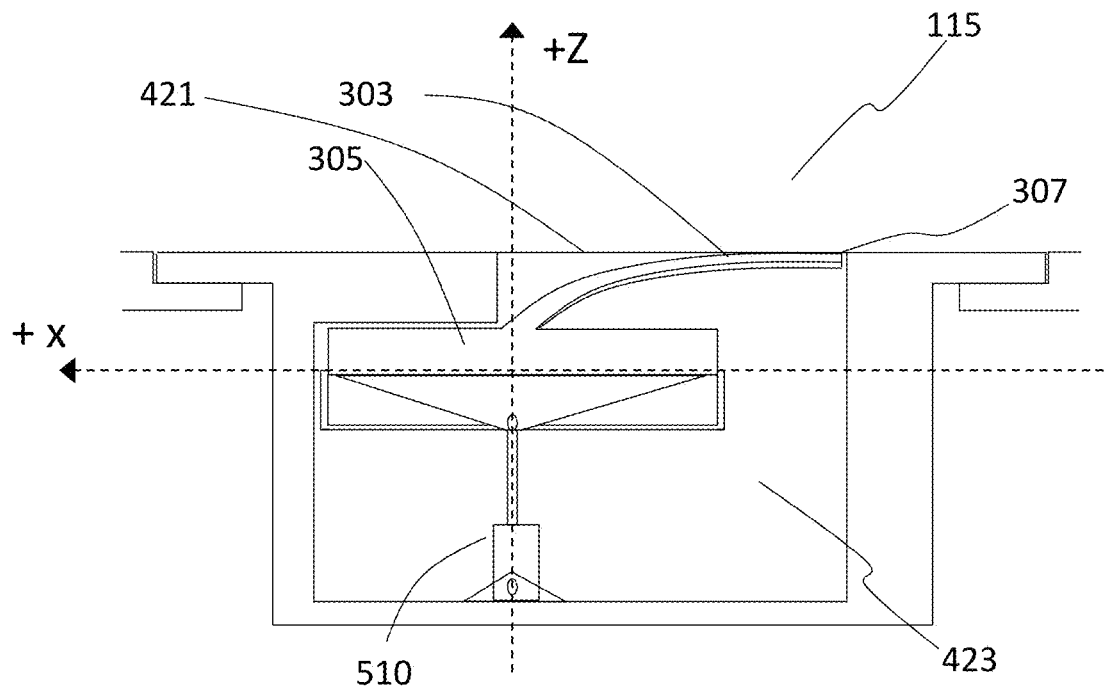
FIG. 6B is a front sectional view of vortex generator arrangement of FIG. 4B through the plane XZ given in FIG. 4B.

With reference to FIGS. 6A and 6B, a gap 601 is provided between the side wall 413 of the casing 401 and the airflow modification device 301. Such a gap 601 may be preferable for providing a path for installing or replacing the actuator arrangement 510 or other internal components within the casing 401 or for carrying out maintenance or service inspections. It should be appreciated that such a gap 601 may not be required and that instead, the side wall 413 of the casing 401 may be configured such that the sidemost edge 309 of the resiliently deformable base member 305 substantially abuts the interior surface of the side wall 413 when it is in the first state and second state, and that the side wall 413 of the casing 401 may also be configured to substantially abut the sidemost edge 307 of the resiliently deformable flap member 303 when it is in a buckled second state. It may be preferable to do so in order to prevent liquids and contaminants from collecting within the cavity 423.

It is also shown that the coupling 513 substantially spans the resiliently deformable base member 305 in the X direction. This ensures that the load applied vertically by the actuator arrangement 510 in the Z direction is distributed evenly across the X dimension span of the resiliently deformable base member 305 via the coupling 513. Attaching the linear actuator 511 at the second end to the coupling 513 using a pivotal clevis pin 523 may allow for easier installation and replacement of the linear actuator 511 when required. The use of pivotal connections 519 and 523 in the actuator arrangement 510 ensures that bending loads are not applied to the resiliently deformable base member 305 when the vertical load is applied, which may cause unintended deformation of the aircraft airflow modification device 301.

Figure 7A:
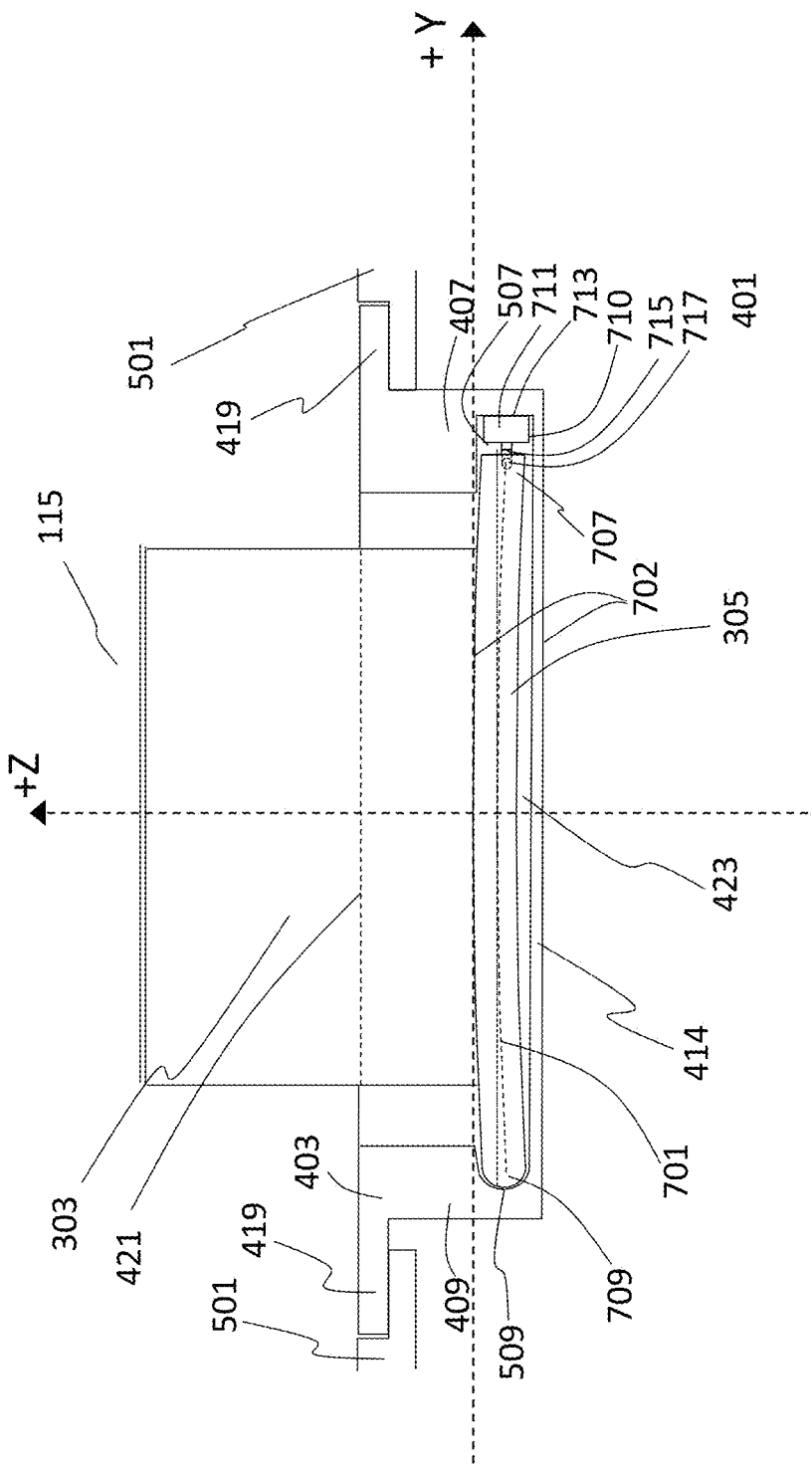
FIG. 7A is a front sectional view of vortex generator arrangement of FIG. 4A, according to a further embodiment of the present technology.

With reference to FIG. 7A, an alternative embodiment is shown. The vortex generator arrangement 115 of this embodiment is substantially the same as that shown in FIG. 4A.

An airflow modification device 301 is installed within the cavity 423. The resiliently deformable base member 305 of the device is formed such that in its first unbuckled state it is overall slightly curved in shape in the positive Z direction, represented in the figure by the dashed line 701 and the upper and lower surfaces 702. A first end 709 of the resiliently deformable base member 305 is rounded in shape and is positioned within a corresponding first slot 509 which also has a corresponding round shape such that the first end 709 substantially conforms to the interior surface of the first slot 509.

A second end 707 of the resiliently deformable base member 305 is positioned within a corresponding second slot 507 of similar corresponding shape. An actuator arrangement 710 is provided in the second slot 507. The actuator arrangement comprises a linear actuator 711. The linear actuator 711 is fixed at a first end 713 to the foremost wall 407 of the casing 401.

A second end 715 of the linear actuator 711 is pivotally attached the second end 707 of the resiliently deformable base member 305 by a clevis pin 717. The actuator arrangement 710 is such that the resiliently deformable base member 305 can rotate relative to the second end 715 of the linear actuator 711 in a sense that is substantially parallel to the YZ plane.

When the actuator arrangement 710 is in a first position as shown in a FIG. 7A, the resiliently deformable base member 305 is in a first state which is an unbuckled state and the resiliently deformable flap member 303 is therefore in a corresponding first state that is also unbuckled. In this state, the resiliently deformable flap member 303 extends through the opening 421 and functions as a vortex generator in the presence of an airflow flowing over the vertical tail plane 111.

With reference to FIG. 7B, all of the features of FIG. 7A are shown, however in 7B, the actuator arrangement 710 is actuated to second position, such that a force is provided substantially along the lateral axis (Y direction) of the resiliently deformable base member 305 such that the resiliently deformable base member 305 is deformed to a second state which is a buckled state and the resiliently deformable flap member 303 is therefore also deformed to a corresponding second state that is a buckled state. In this state, the resiliently deformable flap member 303 is retracted from the opening 421 such that the resiliently deformable flap member 303 extends substantially in the plane of the section 405 (i.e., in the plane of the OML) so that there no substantial modification of the airflow in proximity to the opening 421. By removing the lateral force applied by the actuator arrangement 710, for example by de-energizing the linear actuator 711, the elastic energy stored within the aircraft airflow modification device 301 is sufficient to drive the linear actuator 711 back, so as to restore the aircraft airflow modification device 301 from the buckled second state to the unbuckled first state.

When compared to the embodiment of FIGS. 5A, 5B, 6A, 6B, ne can see that the casing 401 in the present embodiment does not need to have as big a cavity 423 due to the actuator arrangement 710 requiring a much shorter stroke to achieve the same amount of deformation of the aircraft airflow modification device 301. A piezo type actuator may be preferable for such an arrangement due to their power density is relatively high for a given size. As a result, inner wall 414 of the casing 401 is closer to the outer wall 403 and therefore shallower, resulting in a vortex generator arrangement 115 of the present embodiment being much more compact. Such an arrangement may be preferable where the available internal space of the vertical tail plane 111 is limited and may particularly be required for outboard trailing edge regions of the vertical tail plane 111 or other lifting surfaces.

Where in the foregoing description, integers or elements are mentioned which have known, obvious or foreseeable equivalents; then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft airflow modification device, comprising:
at least one resiliently deformable base member; and
at least one resiliently deformable flap member that extends from the resiliently deformable base member,
wherein deformation of the resiliently deformable base member from a first state to a second state results in corresponding deformation of the resiliently deformable flap member from a first state to a second state, and
wherein the resiliently deformable flap member is integrally formed with the resiliently deformable base member, and,
wherein, in the first state of the at least one resiliently deformable flap member, the at least one resiliently deformable flap member extends perpendicular to the at least one resiliently deformable base member.

2. The aircraft airflow modification device according to claim 1, wherein the first state of the resiliently deformable flap member and the corresponding first state of the resiliently deformable base member are unbuckled states, and the second state of the resiliently deformable flap member and the corresponding second state of the resiliently deformable base member are buckled states.

3. The aircraft airflow modification device according to claim 1, wherein the resiliently deformable flap member or the resiliently deformable base member is formed from at least one of a non-metallic material, metallic material or composite material.

4. An aircraft airflow modification device according to claim 1, wherein a lateral dimension of the resiliently deformable base member is approximately 80 mm.

5. The aircraft airflow modification device according to claim 1, wherein a lateral dimension of the resiliently deformable flap member is approximately 30 mm.

6. The aircraft airflow modification device according to claim 1, wherein a vertical dimension of the resiliently deformable flap member is approximately 20 mm.

7. An aircraft airflow modification device according to claim 1, wherein a thickness of the resiliently deformable flap member is approximately 1 mm.

8. A vortex generator arrangement comprising:
a section that defines an opening to a corresponding cavity;
an aircraft airflow modification device disposed within the cavity further comprising a resiliently deformable flap member and a resiliently deformable base member;
wherein the resiliently deformable flap member of the aircraft airflow modification device, in a first state, extends through the opening when the resiliently deformable base member is in a corresponding first state, and wherein the resiliently deformable flap member of the aircraft airflow modification device, in a second state, is retracted from the opening when the resiliently deformable base member is in a corresponding second state, and
wherein the first state of the resiliently deformable flap member and the corresponding first state of the resiliently deformable base member are unbuckled states.

9. The vortex generator arrangement according to claim 8, further comprising at least one actuator arrangement configured to apply a force to the resiliently deformable base member of the aircraft airflow modification device so as to deform the resiliently deformable base member from the first state to the second state or vice versa.

10. The vortex generator arrangement of claim 9, wherein the actuator arrangement is configured to provide a force substantially in a direction of a vertical axis of the resiliently deformable base member.

11. The vortex generator arrangement of claim 9, wherein the actuator arrangement is configured to provide a force substantially in a direction of a lateral axis of the resiliently deformable base member.

12. The vortex generator arrangement according to claim 9, wherein the actuator arrangement comprises a linear type actuator.

13. An aircraft with at least one vortex generator arrangement according to claim 8.

* * * * *